No. 619,195. Patented Feb. 7, 1899.
G. LOFFI.
SHEARS.
(Application filed May 26, 1898.)
(No Model.)
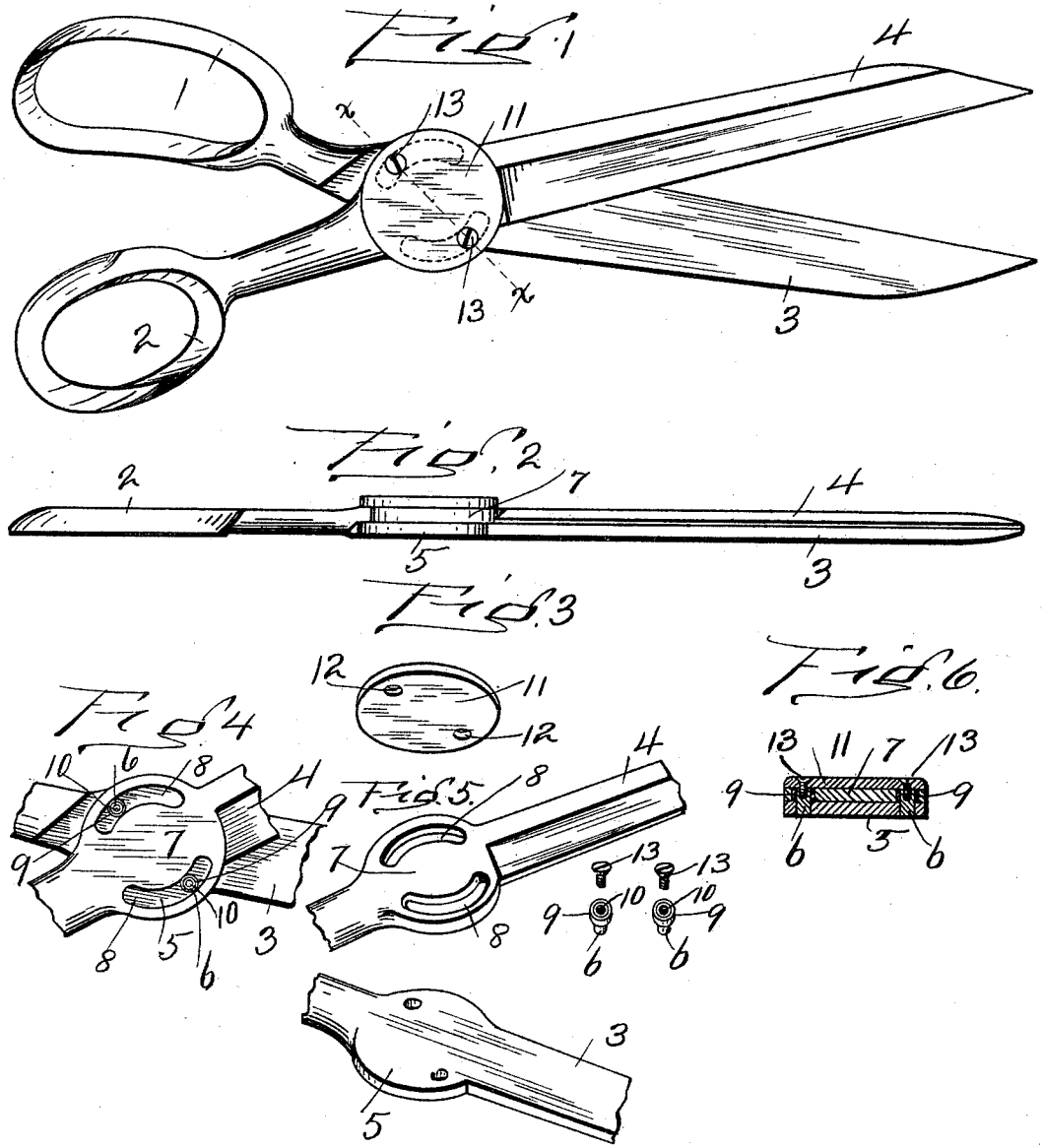
WITNESSES
INVENTOR
George Loffi
BY Fred W. Bond
ATTY.

UNITED STATES PATENT OFFICE.

GEORGE LOFFI, OF CANTON, OHIO.

SHEARS.

SPECIFICATION forming part of Letters Patent No. 619,195, dated February 7, 1899.

Application filed May 26, 1898. Serial No. 681,797. (No model.)

*To all whom it may concern:*

Be it known that I, GEORGE LOFFI, a citizen of the United States, residing at Canton, in the county of Stark and State of Ohio, have invented certain new and useful Improvements in Shears; and I do hereby declare that the following is a full, clear, and exact description of the same, reference being had to the annexed drawings, making a part of this specification, and to the figures of reference marked thereon, in which—

Figure 1 is a side view of the shears. Fig. 2 is an edge view. Fig. 3 is a detached view of the cap. Fig. 4 is a view of the joint, showing the cap removed. Fig. 5 shows detached views of the different parts of the shears proper, showing portions of the blades and handles. Fig. 6 is a transverse section through line $x$ $x$, Fig. 1.

The present invention has relation to shears; and it consists in the novel arrangement hereinafter described, and particularly pointed out in the claim.

Similar numbers of reference indicate corresponding parts in all the figures of the drawings.

In the accompanying drawings, 1 and 2 represent the handles, which are of ordinary construction and are continued to form the blades 3 and 4. which blades are of ordinary construction. The handle 1 is provided with the enlarged portion or disk 5, which is located at the place where the two handles and blades are to be connected together. To the enlarged portion 5 are securely attached in any convenient and well-known manner the studs 6, which studs are located as illustrated in Figs. 4 and 6. The handle 2 is provided with the enlarged portion or disk 7, which enlarged portion corresponds in size and shape with the enlarged portion 5, and when the handles 1 and 2, together with their blades, are placed in proper position the enlarged portions or disks 5 and 7 are in contact with each other, as illustrated in Fig. 6.

The enlarged portion or disk 7 is provided with the two segmental slots 8, which segmental slots are so formed and located that the studs 6 are passed through said slots when the two blades are placed in proper position in reference to each other.

Upon the studs 6 are located the rollers 9, the diameters of which correspond with the widths of the slots 8 and of a thickness to correspond substantially with the thickness of the enlarged portion or disk 7. The ends of the studs 6 are provided with screw-threaded apertures 10, which are for the purpose hereinafter described.

For the purpose of providing a suitable cover for the enlarged portion 7 the disk 11 is provided, which is located as illustrated in Figs. 1 and 2, and is provided with the apertures 12, through which apertures the screws 13 are passed and extended into the screw-threaded apertures 10, as illustrated in Fig. 6, by which arrangement the disk 11 is securely held in proper position and at the same time the rollers 9 are held against displacement.

It will be understood that by my peculiar arrangement no center rivet is employed and that two contact - joints are provided, by which arrangement the blades are prevented from tilting, as they do when a center rivet is used and after the center rivet has become worn, and another object is that the blades are always held in true operative position with reference to each other, thereby producing shears that will cut properly after they have become worn.

I have described this invention as pertaining to shears only; but it will be understood that the same will apply to scissors without departing from the nature of my invention.

Having fully described my invention, what I claim as new, and desire to secure by Letters Patent, is—

The combination of handles and blades, enlarged portions or disks formed on said blades, fixed studs secured upon the enlarged portion or disk of one of said handles, rollers located thereon, segmental slots formed in the enlarged portion or disk of the other handle having located therein the studs and rollers, and a disk fixed to the studs, substantially as and for the purpose specified.

In testimony that I claim the above I have hereunto subscribed my name in the presence of two witnesses.

GEORGE LOFFI.

Witnesses:
J. A. JEFFERS,
F. W. BOND.